(12) United States Patent
Hanson et al.

(10) Patent No.: US 8,774,787 B2
(45) Date of Patent: Jul. 8, 2014

(54) METHODS AND SYSTEMS FOR PROVIDING LOCATION-SENSITIVE CONFERENCE CALLING

(75) Inventors: Karrie Hanson, Westfield, NJ (US); Gerald Karam, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 481 days.

(21) Appl. No.: 12/628,799

(22) Filed: Dec. 1, 2009

(65) Prior Publication Data

US 2011/0130131 A1    Jun. 2, 2011

(51) Int. Cl.
*H04M 3/42*     (2006.01)

(52) U.S. Cl.
USPC .......................................................... 455/416

(58) Field of Classification Search
USPC ................ 455/416–420, 456.1–456.3, 414.1; 379/202.01, 203.01, 204.01, 205.01; 348/14.1–14.6, 14.01–14.09
See application file for complete search history.

(56) References Cited

U.S. PATENT DOCUMENTS

| | | | |
|---|---|---|---|
| 6,978,002 B1 * | 12/2005 | Cope et al. | 379/202.01 |
| 7,031,700 B1 * | 4/2006 | Weaver et al. | 455/420 |
| 7,133,514 B1 * | 11/2006 | Cook et al. | 379/202.01 |
| 8,045,489 B2 * | 10/2011 | Lee et al. | 370/260 |
| 8,126,129 B1 * | 2/2012 | McGuire | 379/202.01 |
| 2003/0197615 A1 * | 10/2003 | Roche et al. | 340/573.1 |
| 2007/0165799 A1 * | 7/2007 | Juncker | 379/88.21 |
| 2010/0061538 A1 * | 3/2010 | Coleman et al. | 379/202.01 |

* cited by examiner

*Primary Examiner* — Brandon Miller
(74) *Attorney, Agent, or Firm* — Parks IP Law LLC; Mickki D. Murray, Esq.

(57) ABSTRACT

Systems and methods for providing location based conference calling services on communications networks. Location information relating to a device is passed to a location sensitive conference calling system. The location sensitive conference calling system uses the location information to identify a conference calling system, or a conference bridge associated with a conference calling system, to which to connect the device. The device is connected with the conference calling system, or a conference bridge associated with the conference calling system.

17 Claims, 5 Drawing Sheets

METHODS AND SYSTEMS FOR PROVIDING LOCATION-SENSITIVE CONFERENCE CALLING

TECHNICAL FIELD

The present disclosure relates generally to communications networks and, more particularly, to methods and systems for providing location sensitive conference calling on communications networks.

BACKGROUND

Over the past several years, the use of mobile communications devices and networks has increased. Some communications networks include devices and software for providing users with location based services. Location based services (LBS) are services tailored to a location of a device. Some wireless devices include global positioning system (GPS) capability for determining the location of the wireless device for navigation, rescue, or other purposes. Some devices include other systems and methods for determining the location of the device such as, but not limited to, triangulation using network and/or WI-FI® resources, assisted GPS (A-GPS), E911, satellite links, and the like (WI-FI is a registered trademark of the Wi-Fi Alliance, of Austin, Tex.).

With the increasing sophistication of communications devices, communications networks, and communications device users, some sophisticated device capabilities are becoming more commonplace. For example, visual voicemail, navigation applications, Internet applications, e-commerce applications, social networking applications, and the like, which were until recently unavailable for many communications devices, are becoming popular features and/or applications for some accounts and devices. Other sophisticated device and network capabilities are implemented by communications network operators, application authors, and/or communications device manufacturers to provide users with new services, such as location based services.

SUMMARY

Systems and methods for providing location based conference calling services on communications networks are disclosed. Location information relating to a device is passed to a location sensitive conference calling system. The location sensitive conference calling system uses the location information to identify a conference calling system, or a conference bridge associated with a conference calling system, to which to connect the device. The device is connected with the conference calling system, or a conference bridge associated with the conference calling system.

One embodiment of the present disclosure is directed to a location sensitive conference calling system. The system includes a location based conference call router (LBCR) having a processor and a memory for storing computer readable instructions. Execution of the computer readable instructions by the processor make the LBCR operable to receive a communication associated with a mobile communications device. The communication includes location information indicating a geographic location of the mobile communications device. Execution of the computer readable instructions by the processor make the LBCR further operable to identify, based upon the location information, a conference call system (CCS) component to which to connect the communication, and route the communication to the identified CCS component.

In some embodiments, the system includes an interactive voice response (IVR) system. The IVR system includes an IVR processor and an IVR memory configured to store IVR instructions. The IVR instructions are executable by the IVR processor to make the IVR operable to receive a communication from the mobile communications device, and connect the mobile communications device with the LBCR.

In some embodiments, the system includes a data server configured to receive a communication from the mobile communications device, retrieve user information associated with the mobile communications device, receive location information associated with the mobile communications device, and transmit the user information and the location information to the LBCR. The mobile communications device participates in a data session with the data server, wherein the mobile communications device conducts the data session using a location sensitive conference calling service application.

In some embodiments, the system includes a route database. The route database is configured to store data associating location information with one or more conference call system (CCS) components. In some embodiments, the CCS components include a CCS or a conference bridge associated with a CCS. The route database is accessible by the LBCR, which accesses the route database to identify the CCS component to which to connect the communication.

In some embodiments, the LBCR queries the route database for a CCS component associated with the location information. In some embodiments, the LBCR includes a network interface. In some embodiments, the LBCR is associated with a telephone number and the instructions further include instructions, the execution of which by the processor make the LBCR further operable to receive a telephone call at the LBCR for the mobile communications device via the network interface if the mobile communications device connects to the telephone number. In some embodiments, the instructions include instructions, executable by the processor to make the LBCR operable to receive the communication from the IVR.

In some embodiments, the system includes a global positioning system (GPS) device associated with the mobile communications device. The location information includes location data generated by the GPS device, and the instructions further include instructions, executable by the processor to make the LBCR operable to receive the location data.

In some embodiments, the location data generated by the GPS device is transmitted to the data server. In some embodiments, the data server forwards the location data to the LBCR. In some embodiments, the instructions for receiving further include instructions, executable by the processor to make the LBCR operable to receive the user information and the location information from the data server.

In some embodiments, the IVR instructions further include IVR instructions, executable by the IVR processor to make the IVR operable to query the mobile communications device for the location information, and receive input from the mobile communications device, the input including the location information.

In some embodiments, the IVR instructions further include IVR instructions, executable by the IVR processor to make the IVR system operable to receive the location data.

In some embodiments, the instructions for routing further include instructions, executable by the processor, to make the LBCR operable to call the mobile communications device. In some embodiments, the LBCR identifies the mobile communications device based, at least partially, upon user information. In some embodiments, the LBCR routes communication to the CCS component by routing a call including the mobile communications device to the CCS component.

Another embodiment of the present disclosure is directed to a method of providing a mobile communications device with a location sensitive conference calling service. The method includes receiving, at a location based conference call router (LBCR) operating on a communications network, a communication associated with the mobile communications device. The communication includes location information indicating a geographic location of the mobile communications device. The method further includes identifying, at the LBCR, a conference call system (CCS) component to which to connect the communication. The LBCR identifies the CCS component based, at least partially, upon the location information. The method further includes routing, at the LBCR, the communication to the CCS component.

In some embodiments, receiving the communication includes receiving at the LBCR, the communication from an interactive voice response (IVR) system in communication with the LBCR.

In some embodiments, identifying the CCS component includes transmitting the location information to a route database in communication with the LBCR, and receiving, at the LBCR, data identifying the CCS component.

In some embodiments, receiving the communication includes receiving user information including data identifying the mobile communications device. The method further includes identifying, at the LBCR, the identity of the mobile communications device based, at least partially, upon the user information, and calling, at the LBCR, the mobile communications device. In some embodiments, routing the communication includes routing the call to the CCS component.

In some embodiments, the method further includes obtaining, at the IVR system, the location information and user information associated with the mobile communications device. In some embodiments, the method further includes generating, at the IVR system, a query for the location information and the user information, transmitting, from the IVR system, the query, and receiving, at the IVR system, a response to the query. The response to the query is sent to the IVR via the mobile communications device. In some embodiments, receiving the response includes receiving audio input from a user of the mobile communications device. In some embodiments, receiving the response includes receiving, at the IVR system, global positioning service (GPS) data generated by a GPS device associated with the mobile communications device.

DETAILED DESCRIPTION

As required, detailed embodiments of the present disclosure are disclosed herein. It must be understood that the disclosed embodiments are merely examples of the disclosure that may be embodied in various and alternative forms, and combinations thereof. As used herein, "exemplary" and similar terms are used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
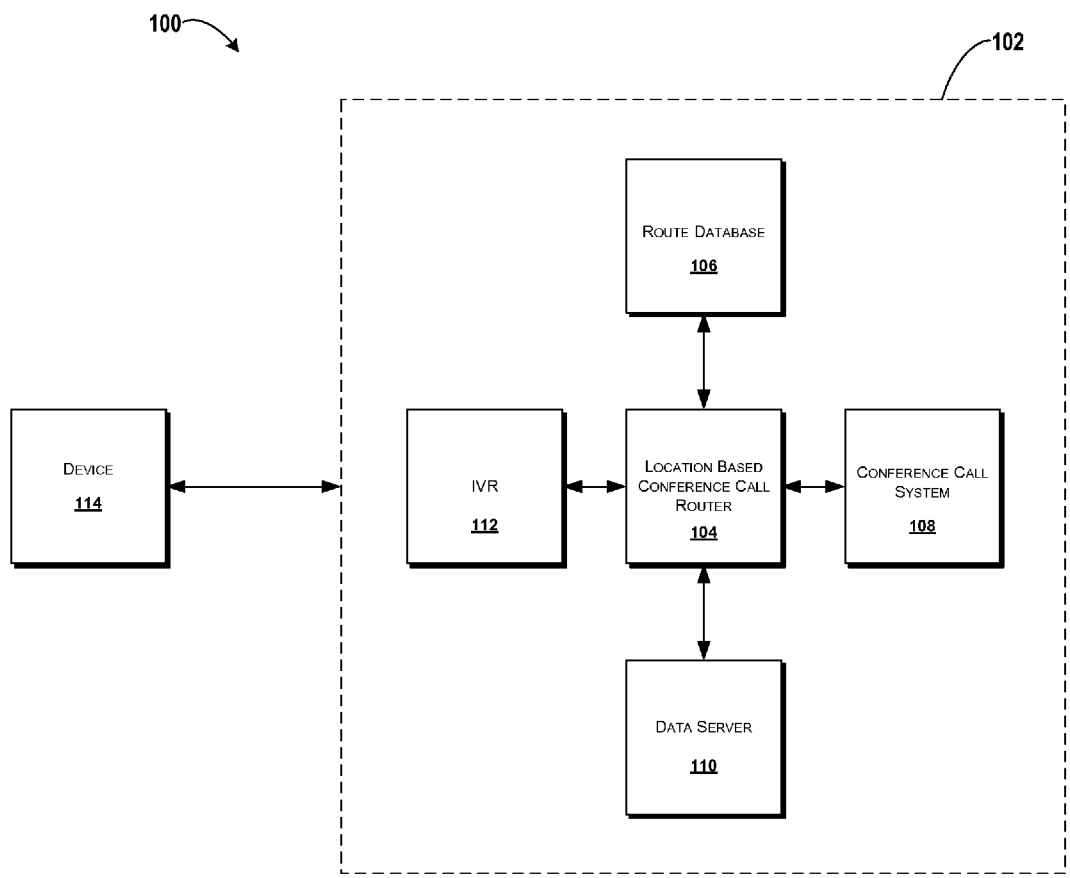
FIG. 1 schematically illustrates a system for providing location based conference calling services, according to an exemplary embodiment of the present disclosure.

Referring now to the drawings in which like numerals represent like elements throughout the several views, FIG. 1 schematically illustrates a system 100 for providing location based conference calling, according to an exemplary embodiment of the present disclosure. The system 100 includes a communications network 102. In some embodiments, the communications network 102 includes a cellular network, a packet data network, for example, the Internet (Internet), a circuit switched network, for example, a publicly switched telephone network (PSTN), other networks, combinations thereof, and the like. In the described exemplary embodiments, the communications network 102 is described as a cellular network, though alternative and/or additional networks are contemplated.

The cellular network includes components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS) components, and the like. The cellular network also includes radios and nodes for receiving and transmitting voice, data, and combinations thereof to and from radio transceivers, networks, and the Internet.

In some embodiments, the cellular network is configured as a 2G GSM (Global System for Mobile communications) network, and provides data communications via GPRS (General Packet Radio Service) and EDGE (Enhanced Data rates for GSM Evolution). In some embodiments, the cellular network is configured as a 3G UMTS (Universal Mobile Telecommunications System) network and provides data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network is also compatible with mobile communications standards including, but not limited to, pre-4G, LTE (Long-Term Evolution), and 4G, for example.

It should be appreciated that in some embodiments substantially all of the functionality described with reference to the communications network 102 is performed by a cellular network alone, or in combination with other networks, network elements, and the like, and that some elements are not illustrated. While the communications network 102 will be described herein as a cellular network, it should be understood that other networks are possible and are contemplated.

The communications network 102 includes a location based conference call router 104 (LBCR). The LBCR 104 includes one or more processors, one or more communications interfaces, and one or more hardware modules and/or software modules (the processors, interfaces, and modules are not shown in detail). The LBCR 104 includes, or is in communication with, one or more data storage devices such as, for example, a memory, a database, a network server, and the like (not shown in detail). In some embodiments, the LBCR 104 is in communication with a route database 106, which stores data indicating data associations for conference call bridges and location information, as explained further below.

The communications network 102 includes a conference call system 108 (CCS) that is in communication with the LBCR 104. The CCS 108 includes various hardware and/or software modules, as is generally known, and one or more communications interfaces (not shown in detail). The CCS 108 provides conference calling services and hosts one or more conference bridges, which are implemented using hardware and/or software. In some embodiments, the CCS 108 hosts conference bridges. Two or more callers dial a number associated with the CCS 108, a conference bridge of the CCS 108, or a number associated with the location sensitive conference calling system 100. The callers are joined to the virtual conference and can communicate with one another.

Returning briefly to the route database 106, in some embodiments, the records stored at the route database 106 include data identifying one or more CCS's 108 and/or one or more conference bridges associated with one or more CCS's 108. Similarly, the route database 106 stores location information corresponding to the CCS's 108 and/or the one or more conference bridges associated with the one or more CCS's 108. In some embodiments, the CCS 108 is configured to receive a query having location information, and to respond with identification information for a CCS 108 and/or a conference bridge associated with the CCS 108.

The communications network 102 includes a data server 110. The data server 110 includes one or more processors, one or more data storage devices, for example, a memory, one or more network interfaces, and one or more software and/or hardware modules (not shown in detail). The data server 110 is configured to communicate with other devices via the network interfaces. In some embodiments, the data server 110 receives location information and/or user information and communicates the location information and/or the user information to another network and/or network device.

The communications network 102 also includes an interactive voice response (IVR) system 112. The IVR 112 includes one or more processors, one or more data storage devices, such as a memory or other computer readable medium, and one or more network interfaces (not shown in detail). The processors are configured to execute computer-executable instructions stored at the memory. Execution of the instructions by the processor cause the IVR 112 to execute the functions of the IVR 112, including, but not limited to, those described below with reference to FIG. 3.

The IVR 112 is configured to receive audio input from a user. In some embodiments, the audio input includes a spoken command, for example, a voice response to a prompt generated by the IVR 112. In some embodiments, the audio input includes a dual-tone multi-frequency (DTMF) tone generated by a telephone keypad or another device capable of generating a DTMF tone. In some embodiments, as will be described below, the IVR 112 is capable of receiving data via a data session with a device in communication with the IVR 112.

A mobile communications device 114 is in communication with the communications network 102 or one or more elements thereof, including, but not limited to, the LBCR 104, the route database 106, the CCS 108, the data server 110, the IVR 112, and/or other network systems, subsystems, and/or devices.

The LBCR 104 is accessible by the device 114 via a direct connection, via the IVR 112, and/or via the data server 110. These and other exemplary embodiments of the present disclosure are discussed below with reference to FIGS. 3-5.

Returning to FIG. 1, in some embodiments, the LBCR 104, the route database 106, the CCS 108, the data server 110, and/or the IVR 112 are in communication with other devices and networks (not illustrated). The other devices and networks include devices and networks in communication with, or existing on, the communications network 102, or other networks. In some embodiments, the other devices and networks include, for example, GPS networks, location beacons, billing and/or charging modules, Internet web servers, databases, intranet networks and/or devices, short message service centers (SMSC's), multimedia message service centers (MMSC's), email servers, wireless networking devices, wired networking devices, combinations thereof, and the like.

Figure 2:
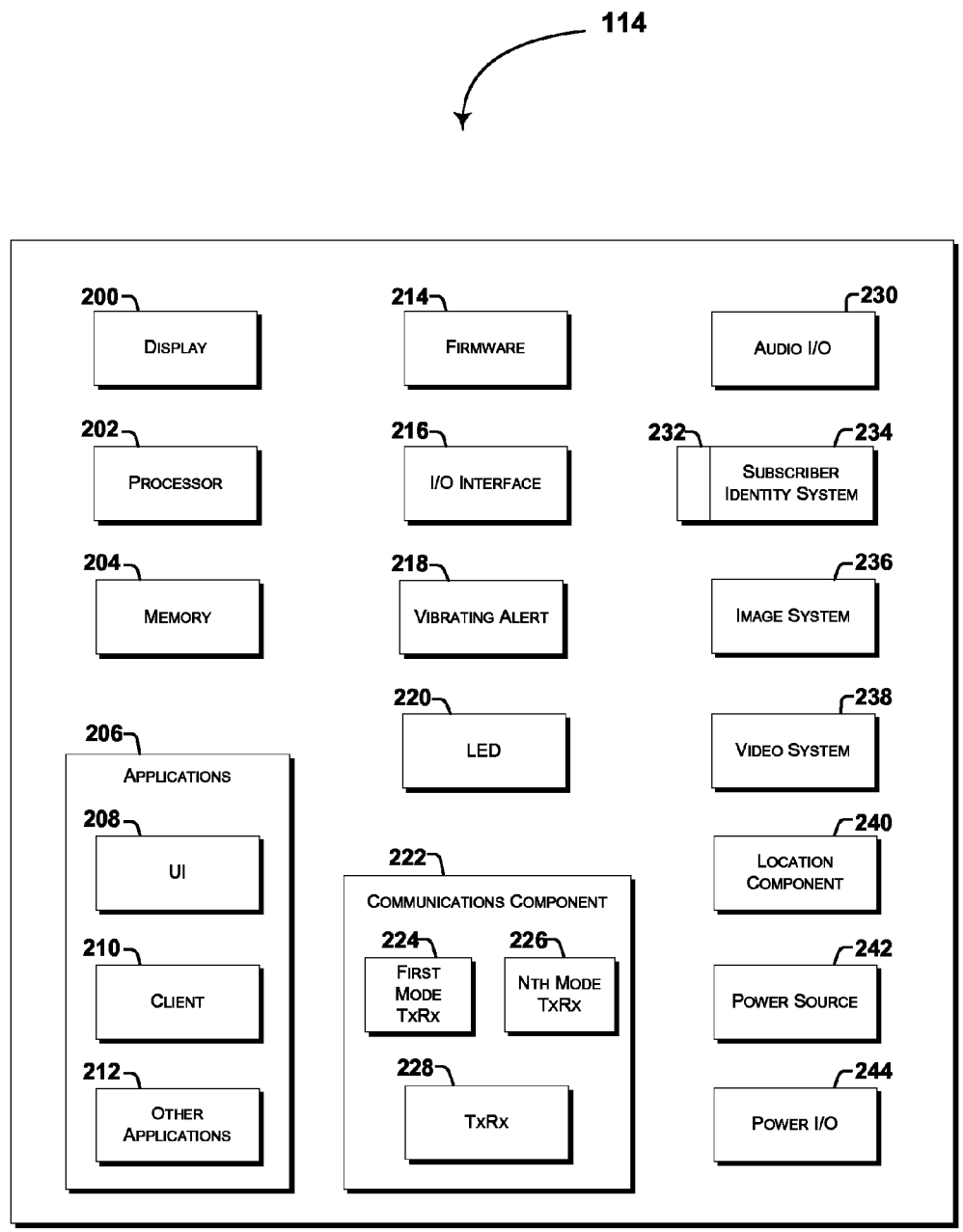
FIG. 2 schematically illustrates an exemplary device with which embodiments of the present disclosure are implemented, according to an exemplary embodiment of the present disclosure.

FIG. 2 illustrates a schematic block diagram of a device 114 for use in accordance with exemplary embodiments of the present disclosure. Although connections between the components are not illustrated in FIG. 2, it should be understood that the components interact with each other to carry out functions of the device 114.

It should be understood that FIG. 2 and the following description are intended to provide a brief, general description of a suitable environment in which the various aspects of some embodiments of the present disclosure are implemented. While the description refers to computer-readable instructions, the present disclosure also can be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications in accordance with principles of the present disclosure can be implemented on various system configurations, including single-processor or multiprocessor systems, minicomputers, mainframe computers, personal computers, hand-held computing devices, microprocessor-based, programmable consumer electronics, combinations thereof, and the like, without departing from the scope of the present disclosure.

The device 114 is a multimode headset, and includes a variety of computer-readable media, including volatile media, non-volatile media, removable media, and non-removable media. The term "computer-readable media" and variants thereof, as used in the description and claims, includes volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium usable to store the desired information, and that is accessible and/or executable by the device 114.

The device 114 includes a display 200 for displaying multimedia such as, for example, text, images, video, telephony functions such as Caller ID data, setup functions, menus, music, metadata, messages, wallpaper, graphics, Internet content, feedback forms, "opt-in" notifications, advertisements or other promotions, device status, preferences settings, map data, navigation data, location data, and the like. The device 114 includes a processor 202 for controlling, executing, and/or processing data. A memory 204 interfaces with the processor 202 and stores data. The data stored by the memory 204 includes computer-readable instructions for execution by the processor 202. The computer-readable instructions include, for example, applications 206.

The applications 206 include, for example, dialing applications, location applications, navigation applications, conference calling applications, web browsing software, feedback applications, text input software, mapping software, audio player software, video playback software, voicemail software, audio playback software, music player software, email software, messaging software, combinations thereof, and the like.

The applications 206 also include user interface (UI) applications 208. The UI applications 208 interface with a client 210 (e.g., an operating system) to facilitate user interaction with device functionality and data, for example, joining a conference call, browsing the Internet, answering/initiating calls, accepting/outputting navigation data, entering/deleting data, configuring settings, address book manipulation, multimode interaction, and the like. The applications 206 also include other applications 212 such as, for example, firmware, navigation software, location sharing software, visual voicemail software, add-ons, plug-ins, voice processing, voice recording, messaging, e-mail processing, video processing, image processing, archival applications, music playback, combinations thereof, and the like. The applications 206 are stored in the memory 204 and/or in a firmware 214 as executable instructions, and are executed by the processor 202. The firmware 214 also stores code for execution during initialization of the device 114.

The device 114 includes an input/output (I/O) interface 216 for input/output of data and/or signals. In some embodiments, the I/O interface 216 is a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and accepts other I/O devices such as, for example, keyboards, keypads, mice, interface tethers, stylus pens, printers, thumb drives, touch screens, multi-touch screens, touch pads, trackballs, joy sticks, microphones, remote control devices, voice control interfaces, monitors, displays, liquid crystal displays (LCD's), combinations thereof, and the like. It should be appreciated that the I/O interface 216 can provide communications between the device 114 and network and/or local devices.

The device 114 includes a vibrating alert 218 for providing a vibration alert function for the device 114. The device 114 also includes one or more light emitting diodes 220 (LED's) for providing device status information, visual alerts, warnings, and the like.

The device 114 includes a communications component 222. The communications component 222 interfaces with the processor 202 to facilitate wired/wireless communications with external systems including, for example, a communications network 102, LBCR's 104, data servers 110, IVR's 112, location servers, VoIP networks, local area networks (LAN's), wide area networks (WAN's), metropolitan area networks (MAN's), personal area networks (PAN's), and other devices and networks, which are implemented, in some embodiments, using WI-FI®, WIMAX®, BLUETOOTH®, near-field communications (NFC), infrared, infrared data association (IRDA), other radio frequency (RF) applications, combinations and/or improvements thereof, and the like (WIMAX is a registered trademark of the WiMAX Forum, of Mountain View, Calif., and BLUETOOTH is a registered trademark of BLUETOOTH SIG, INC., of Bellevue Wash.). The communications component 222 is used instead of, or in addition to, the I/O interface 216.

The communications component 222 includes a multi-mode communications subsystem for providing cellular communications via different cellular technologies. For example, the communications component 222 includes a first cellular transceiver 224 that operates in one mode, for example, GSM, and an Nth transceiver 226 that operates in a different mode, for example, UMTS. Although only two transceivers 224, 226 are illustrated, it should be appreciated that more than two transceivers are possible. The communications component 222 also includes a transceiver 228 for unlicensed communications using technology such as, for example, WI-FI®, WIMAX®, BLUETOOTH®, infrared, IRDA, NFC, RF, and the like.

The communications component 222 facilitates communications reception from terrestrial radio networks, digital satellite radio networks, Internet-based radio services networks, combinations thereof, and the like. The communications component 222 processes data from a network such as, for example, the Internet, a corporate intranet, GPS networks, a home broadband network, and the like, via an internet service provider (ISP), a digital subscriber line (DSL) provider, a cable provider, and/or a broadband provider. It should be appreciated that the communications component 222 includes, or is connected to, one or more antennae through which data is transmitted and/or received.

Audio capabilities are provided by an audio I/O component 230 that includes, but is not limited to, speakers to output audio signals, microphones to collect audio signals, and I/O ports such as, for example, headphone and/or microphone jacks, to input and output audio signals. In some embodiments, the audio I/O component 230 includes more than one speaker, including, for example, an earpiece speaker, a loudspeaker, a ringer, and the like.

The device 114 includes a slot interface 232 for accommodating a subscriber identity system 234 such as, for example, a subscriber identity module (SIM) or universal SIM (USIM). In some embodiments, the subscriber identity system 234 is manufactured into the device 114, thereby obviating the need for a slot interface 232. In some embodiments, the subscriber identity system 234 stores certain features, account information, user information, rules, policies, models, and the like. In some embodiments, a manufacturer, a retailer, a customer, a network operator, or the like programs the subscriber identity system 234.

The device 114 includes an image capture and processing system 236 (image system). Photos and/or videos are obtained via an associated image capture subsystem of the image system 236, for example, a camera. The device 114 also includes a video system 238 for capturing and recording video content. The video system 238 provides video data to various applications 206, such as, for example, video teleconferencing applications, video compression applications, video messaging applications, video sharing applications, and the like.

The device 114 also includes a location component 240 for sending and/or receiving signals for use in determining location. As such, the location component 240 receives, for example, GPS data, A-GPS data, data transmitted via WI-FI®, data transmitted via WIMAX®, cellular network triangulation data, and/or combinations thereof, and the like. The location component 240 receives and/or transmits signals via one or more antennae. The location component 240 interfaces with cellular network nodes, telephone lines, satellites, location transmitters and/or beacons, wireless network transmitters and receivers, for example, WI-FI® hotspots, radio transmitters, combinations thereof, and the like. The device 114 obtains, generates, and/or receives data to identify its location, or transmits data used by other devices to identify the location of the device 114. The device 114 includes a power source 242 such as batteries and/or other power subsystems (AC or DC). The power source 242 interfaces with an external power system or charging equipment via a power I/O component 244.

Figure 3:
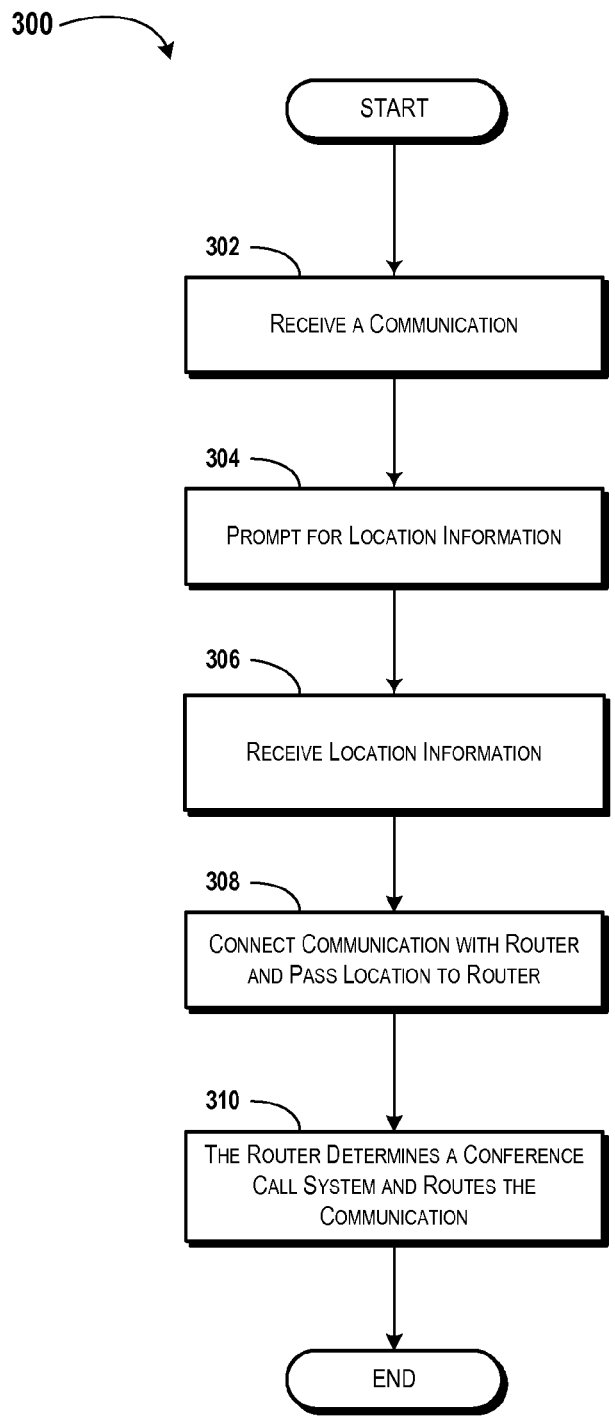
FIG. 3 schematically illustrates a method for providing location based conference calling services, according to an exemplary embodiment of the present disclosure.

FIG. 3 schematically illustrates a method 300 for providing a location sensitive conference calling service, according to an exemplary embodiment of the present disclosure. It should be understood that the steps of the method 300 are not necessarily presented in any particular order and that performance of some or all of the steps in alternative orders are possible and contemplated. The steps have been presented in the demonstrated order for ease of description and illustration. Steps can be added, omitted and/or performed simultaneously, without departing from the scope of the appended claims. It also should be understood that the illustrated method 300 can be ended at any time and need not be performed in its entirety.

Some or all steps of the method 300, and/or substantially equivalent steps, can be performed by execution of computer-readable instructions included on a computer-readable medium. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The method 300 begins, and flow proceeds to block 302, whereat a communication, such as a telephone call, is received at a component associated with the location sensitive conference calling system 100. In the illustrated embodiment, the communication is received at the IVR 112 (the IVR being illustrated in FIG. 1). As mentioned above, the IVR 112 in some embodiments includes a processor and a memory, or pluralities thereof, and execution, by the processor, of computer executable instructions stored in the memory cause the IVR 112 to provide location sensitive conference calling functions, including those functions described herein.

It should be appreciated that prior to the communication being received at the IVR 112, the communication is initiated at a communications device, such as the device 114. In some embodiments, the IVR 112 serves a large geographic area, and relies upon input to identify a location of a calling party. In some embodiments, a calling party interfaces with the IVR 112 to provide the input by using voice commands and/or responses, and/or by entering commands and/or responses via a device keypad, such as by generating dual-tone multi-frequency (DTMF) tones interpreted by the IVR 112 as corresponding to desired commands and/or responses.

As illustrated at block 304, the IVR 112 prompts a mobile communications device 114 or a user of the device for location information. In some embodiments, the IVR 112 prompts the user or the device 114 for location by providing a list of locations from which the user or the device 114 selects a location, prompts the user or device 114 for entry of a mile marker number on a highway, prompts the user or device 114 for entry of a ZIP code, a city or neighborhood in a city, or otherwise prompts for location information. As illustrated at block 306, the IVR 112 receives input from the user or the device 114. The input includes location information interpretable by the IVR 112 as indicating a location of the user and/or the device 114. Because users can access a telephone number by any phone and select of a location, such as in response to being prompted, it will be appreciated that land-line phones (e.g., home or payphone) may be used to access systems according to the present disclosure.

As discussed above, the IVR 112 is in communication with the LBCR 104, for example via respective network interfaces of the IVR 112 and the LBCR 104. In some embodiments, the functions of the IVR 112 and the LBCR 104 are provided by a software and hardware associated with a unitary device, instead of two separate devices. In some embodiments, the IVR 112 and the LBCR 104 are two separate devices. In some embodiments, the IVR 112 and the LBCR 104 communicate directly with one another, and in some embodiments, communications between the IVR 112 and the LBCR 104 occur via other nodes and/or devices of the communications network 102. As illustrated at block 308, the IVR 112 connects the communication with the LBCR 104, and provides the LBCR 104 with the location information obtained from the user or the device 114.

Although not illustrated in FIG. 3, it should be understood that the LBCR 104 is configured to route the communication to a CCS 108 or a conference bridge associated with the CCS 108. In some embodiments, the LBCR 104 routes the communication to the CCS 108 along with data indicating the identified conference bridge. The CCS 108 connects the communication with the identified conference bridge. In some embodiments, the CCS 108 is specific to a particular location, so the LBCR 104 routes the communication to the identified conference bridge, wherein the conference bridge includes a CCS 108. After the communication is routed to the CCS 108 or a particular conference bridge associated with the CCS 108, the device 114 will be connected to a location-sensitive conference call, and the user of the device 114 will be able participate in the conference call.

As illustrated at block 310, the LBCR 104 is configured to identify, based upon the received location information, a conference bridge to which to connect the communication, and to connect the communication with the identified conference bridge. As will be explained in more detail with reference to FIG. 4, the LBCR 104 is configured to access a storage device, for example, the database 106, to identify a conference bridge that corresponds to the obtained location information.

It should be understood that from the perspective of the IVR 112, the communication is simply connected to the LBCR 104 for connection to the appropriate conference bridge. In other words, determination of which conference bridge to which to connect the communication, and/or the particulars about how the determination is made, are not necessarily visible to the IVR 112. In some embodiments, as explained above, the determination is visible to the IVR 112 since the functions of the IVR 112 and the LBCR 104 are provided by a unitary entity. The illustrated embodiment of the method 300 ends.

Figure 4:
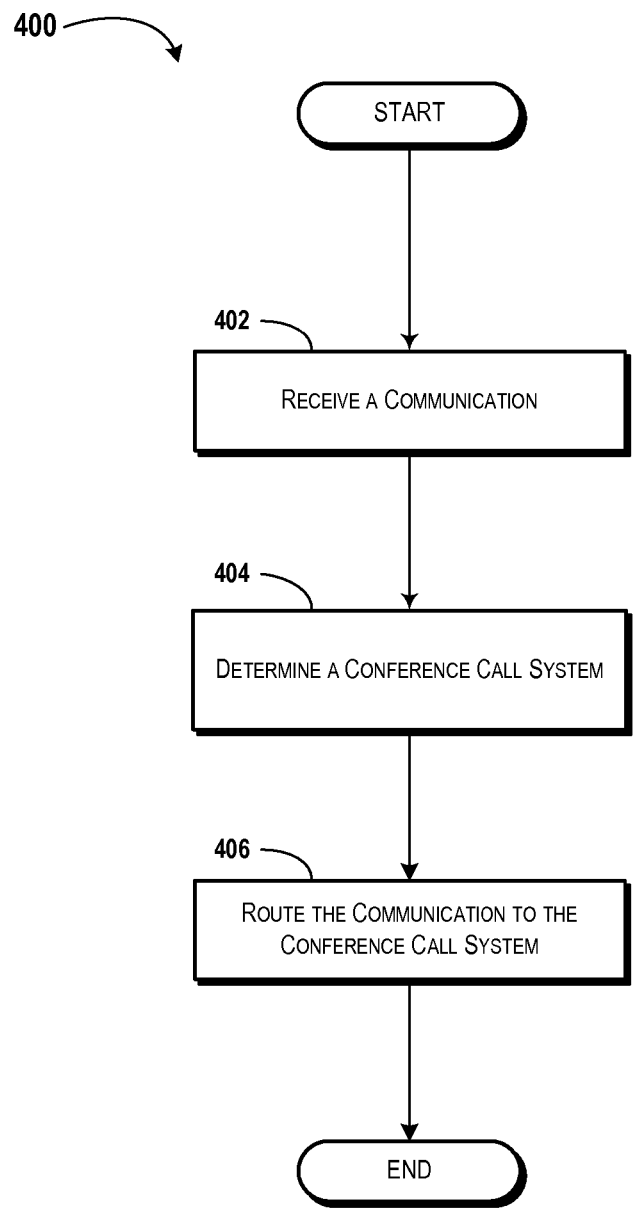
FIG. 4 schematically illustrates a method for providing location based conference calling services, according to another exemplary embodiment of the present disclosure.

FIG. 4 schematically illustrates a method 400 for providing a location sensitive conference calling service, according to another exemplary embodiment of the present disclosure. It should be understood that the steps of the method 400 are not necessarily presented in any particular order and that performance of some or all of the steps in an alternative order(s) is possible and is contemplated. The steps have been presented in the demonstrated order for ease of description and illustration. Steps can be added, omitted and/or performed simultaneously, without departing from the scope of the appended claims. It also should be understood that the illustrated method 400 can be ended at any time and need not be performed in its entirety. Some or all steps of the method 400, and/or substantially equivalent steps, can be performed by execution of computer-readable instructions included on a computer-readable medium, as defined above.

The method 400 begins, and flow proceeds to block 402, whereat a device associated with the location sensitive conference calling system 100 receives a communication. In the illustrated embodiment, the communication is received at the LBCR 104 (the LBCR being illustrated in FIG. 1). In some embodiments, the communication received at the LBCR 104 includes a phone call forwarded to or connected with the LBCR 104 by the IVR 112. In some embodiments, the LBCR 104 is associated with a telephone number for a conference calling service, and the LBCR 104 receives a telephone call dialed by the device 114. In some embodiments, the communication includes a data session, and the LBCR 104 receives a request to communicate with a device, for example the device 114, via the data session. Other embodiments are possible and are contemplated.

In some embodiments, though not illustrated, the LBCR 104 receives location information associated with the communication. For example, in some embodiments, the location information is received from the IVR 112 or the device 114 when the communication is connected with the LBCR 104. In some embodiments, the LBCR 104 receives location information generated at the device 114, and in some embodiments, the LBCR 104 receives location information identified by another entity, for example, the IVR 112, a location server, or another device. In some embodiments, the LBCR 104 is associated with a conference calling system number, and the location of the device 114 is identified based upon the dialed number, wherein a plurality of telephone numbers (e.g., toll-free telephone numbers) are associated with the LBCR 104 and wherein the telephone numbers are associated with different locations. In some embodiments, the dialed number reveals the location of the device 114, such as the final five digits of the telephone number matching a zip code, the final three digits matching a zip code, or certain digits or the entire telephone number matching a code assigned in the system to a certain location.

As illustrated at block 404, the LBCR 104 identifies a CCS 108 and/or a conference bridge associated with the CCS 108 to which the communication should be connected. In some embodiments, the LBCR 104 accesses a storage location, for example, the route database 106, and identifies a conference bridge that is associated with the known, determined, or obtained location information.

As illustrated at block 406, the LBCR 104 routes the communication to a CCS 108 or a conference bridge associated with the CCS 108. In some embodiments, the LBCR 104 routes the communication to the CCS 108 along with data indicating the identified conference bridge. The CCS 108 connects the communication with the identified conference bridge. In some embodiments, the CCS 108 is specific to a particular location, so the LBCR 104 routes the communication to the identified conference bridge, wherein the conference bridge includes the CCS 108. After the communication is routed to the CCS 108 or a particular conference bridge associated with the CCS 108, the device 114 will be connected to a location-sensitive conference call, and the user of the device 114 will be able participate in the conference call. The illustrated embodiment of the method 400 ends.

Figure 5:
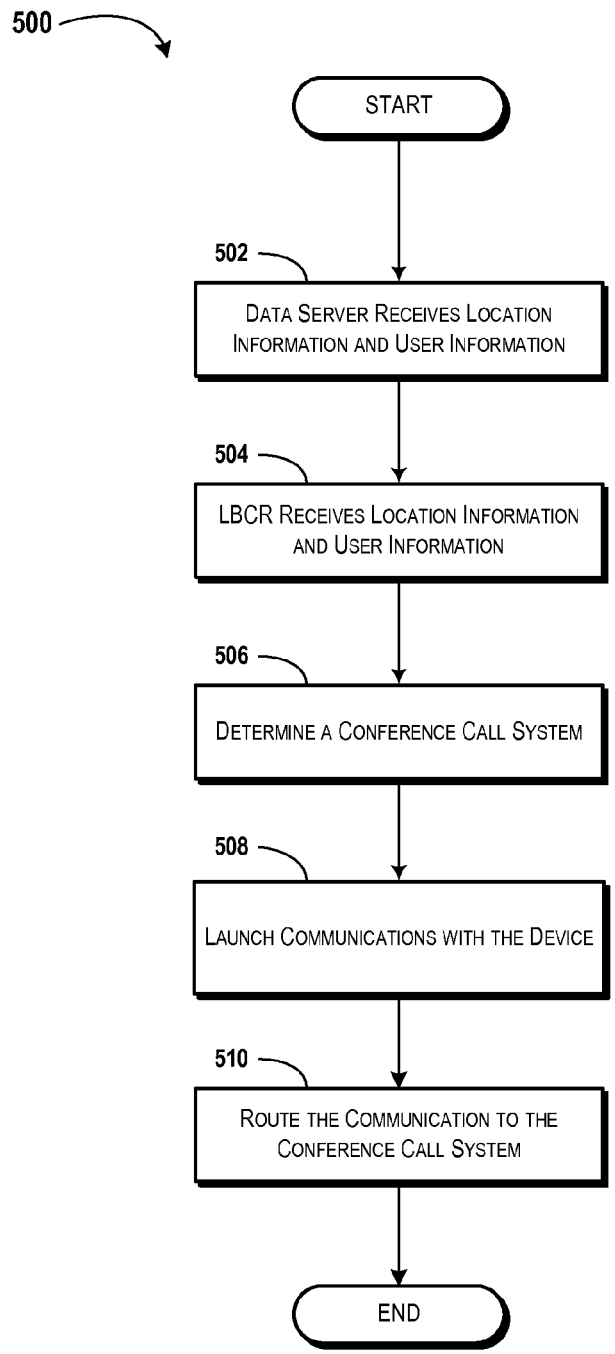
FIG. 5 schematically illustrates a method for providing location based conference calling services, according to yet another exemplary embodiment of the present disclosure.

FIG. 5 schematically illustrates a method 500 for providing a location sensitive conference calling service, according to another exemplary embodiment of the present disclosure. It should be understood that the steps of the method 500 are not necessarily presented in any particular order and that performance of some or all of the steps in alternative orders are possible and contemplated. The steps have been presented in the demonstrated order for ease of description and illustration. Steps can be added, omitted and/or performed simultaneously, without departing from the scope of the appended claims. It also should be understood that the illustrated method 500 can be ended at any time and need not be performed in its entirety. Some or all steps of the method 500, and/or substantially equivalent steps, can be performed by execution of computer-readable instructions included on a computer-readable medium, as defined above.

The method 500 begins, and flow proceeds to block 502, whereat a mobile communications device 114 communicates with a data server 110 associated with the location sensitive conference calling system 100. In the illustrated embodiment, the device 114 is executing computer-executable instructions stored on a computer-readable medium to provide the device 114 with a location sensitive conference calling service. In practice, the user of the device 114 activates a location sensitive conference calling application and the application determines the location of the device 114. The device 114 communicates the location to the data server 110. In some embodiments, the device 114 communicates with the data server 110 via a PDP context established over a UMTS network. Other types of data sessions and network protocols are possible and are contemplated.

In addition to the device 114 transmitting location information to the data server 110, the device 114 also transmits user information, such as information identifying the mobile communications device 114 or a user of the mobile communications device. In some embodiments, the user information includes an International Mobile Subscriber Identity (IMSI), an International Mobile Equipment Identity (IMEI), a Mobile Subscriber Integrated Services Digital Network (MSISDN) number, an Internet Protocol (IP) address, a Media Access Control (MAC) address, combinations thereof, and the like.

The data server 110 and the LBCR 104 are communicatively linked, either via respective network interfaces, or through a communicative coupling. In some embodiments, the functions of the LBCR 104 and the data server 110 are performed by a unitary device.

As illustrated at block 504, the LBCR 104 receives the location information and the user information from the data server 110. In some embodiments, as explained above, the functions of the LBCR 104 and the data server 110 are performed by a unitary device, for example the LBCR 104. As such, it should be understood that the LBCR 104 is configured, in some embodiments, to participate in a peer-to-peer data session with the device 114, and to receive the location information and the user information directly from the device 114, without the interposition of the data server 110. As such, the method 500 commences, in some embodiments, with block 504. In all embodiments of the method 500, the location information and the user information are received at a location sensitive calling system, for example the LBCR 104, as illustrated in FIG. 5.

As illustrated at block 506, the LBCR 104 identifies, based upon the location information received from the data server 110, a CCS 108 and/or a conference bridge associated with a CCS 108 to which the device 114 should be connected. In some embodiments, the LBCR 104 accesses a storage location, for example, the route database 106, and identifies a CCS 108 and/or a conference bridge associated with a CCS 108. In some embodiments, the LBCR 104 identifies the CCS 108 and/or the conference bridge associated with the CCS 108 to which the device 114 should be connected by accessing the route database 106 and searching for a record associated with the known, determined, or obtained location information. In some embodiments, the records stored at the route database 106 include data identifying one or more CCS's 108 and/or one or more conference bridges associated with one or more CCS's 108. The LBCR 104 receives or retrieves the data identifying the one or more CCS's 108 and/or the one or more conference bridges.

As illustrated at block 508, the LBCR 104 launches a communication with the device 114. It should be understood that the LBCR 104 uses the user information received from the data server 110 or from the device 114 to identify the device 114 and launches a communication with the identified device 114. In some embodiments, the LBCR 104 launches the communication by initiating a telephone call to the device 114. In some embodiments, the communication includes a VoIP session, so the LBCR 104 initiates a data session between the LBCR 104 and the device 114. Other modes of communication are possible and are contemplated.

As illustrated at block 510, the LBCR 104 connects the device 114 to a CCS 108 or a conference bridge associated with the CCS 108. In some embodiments, the LBCR 104 connects a communication existing between the LBCR 104 and the device 114 to a connection between the LBCR 104 and the CCS 108 or a conference bridge associated with the CCS 108. In some embodiments, the LBCR 104 creates a conference call between the device 114 and the CCS 108 or a conference bridge associated with the CCS 108. In some embodiments, the steps of blocks 508 and 510 are essentially performed simultaneously, as the LBCR 104 sends an instruction to the communications network 102 and/or the device 114 to initiate a communication between the device 114 and the CCS 108 or the conference bridge associated with the CCS 108. The illustrated embodiment of the method 500 ends.

In some embodiments, the disclosed systems and methods are used to provide a location sensitive conference calling service on a wireless communications network. In a contemplated embodiment, the location sensitive conference calling service is accessed by dialing a telephone number. The telephone number for the location sensitive conference calling service is advertised via a road sign or billboard along a highway or other road. In some embodiments, a user dials the advertised or posted telephone number and the call is routed to an LBCR 104 or an IVR 112.

When the call is connected to the LBCR 104 or the IVR 112, the user is prompted for location information. In some embodiments, the user is prompted for a mile marker or other geographic information. In some embodiments, the user is prompted for a location-specific code that is advertised with the telephone number for the location sensitive conference calling service. In some embodiment, the location-specific code could be a zip code, area code, or the like. The LBCR 104 or the IVR 112 is able, in some embodiments, to access the location component 240 of the device 114, so the LBCR 104 or the IVR 112 prompts the user or device 114 for permission to retrieve or share location information.

In some embodiments, a user of a device 114 initializes a location sensitive conference calling application at the device 114. Location information and user information are passed, in some embodiments, to a data server 110 and/or an LBCR 104. The location information is generated by the location component 240 of the device 114, or entered by a user via the location sensitive conference calling application. The LBCR 104 retrieves information indicating a CCS 108 or a conference bridge associated with a CCS 108 to which to connect the device 114, as explained above. The LBCR 104 connects the device 114 to the CCS 108 or a conference bridge associated with a CCS 108, as explained above.

As understood from the above descriptions, a user of a device 114 is able to connect to a location sensitive conference call based upon location information retrieved from a location component, entered by a user, and/or based upon a direct dialed number. As such, a user is connected with a location sensitive conference call in which other users may share very little in common other than their current location. In some contemplated embodiments, the location sensitive conference calling service is particularly useful in the case of traffic jams or other travel-related delays such as airport delays, flat tires, or breakdowns. For example, a caller in traffic headed northbound could connect to a conference call on which southbound callers could advise the northbound caller about the traffic, such as regarding the source of the traffic (e.g., accident), the extent of the traffic (e.g., miles or through which exits).

A traveler stuck in an unknown location uses the location sensitive conference calling service to speak with other similarly situated users or locals who may be able to share restaurant, lodging, or entertainment insights and recommendations. For example, local organizations, such as a Chamber of Commerce, historical societies, scholastic booster clubs, and the like. Similarly situated users could include, for example, experts on a topic, regardless of whether they are proximate a particular location, such as a location associated with the topic.

In some embodiments, the communications network 102 is configured so that, as an alternative to people providing information on the call live, or in addition to that, the system stores recordings provided to users. The hardware and/or software associated with this implementation may be referred to as a recording bot or message service.

It is also contemplated that the location sensitive conference call system, such as the LBCR 104 and/or a related component (e.g., one of the devices shown in FIG. 1), may include sub-conference call system (CCS) components or bridges. For example, the conference call system is in some embodiments configured to present a caller with options for connecting to a sub-CCS or bridge of a CCS or bridge, such as a local traffic CCS or bridge, or a local entertainment CCS or bridge. Alternatively, in some embodiments, a CCS is dedicated to one or more topics (e.g., traffic, local events, and restaurants).

In some embodiments, the system 102 according to the present disclosure is configured to allow callers to call directly to the same CCS component 108, or conference bridge associated with the CCS component 108, to which the LBCR 104 routes callers based on location. In some particular embodiments, the CCS component 108 or conference bridge has a phone number associated with it, so that calls from this class of users, dialing directly into a conference bridge, go directly to the CCS component 108 or conference bridge.

Various types of callers may be interested in direct-dialing a CCS component 108 or associated conference bridge, for various reasons, and the callers may obtain the call-in number in various ways. In one contemplated implementation, administrative users connect directly to a CCS component 108 or associated conference bridge. Administrative users may seek to obtain and/or provide information to callers routed to the call by the LBCR 104. For instance, in the highway traffic examples described above, a highway-patrol or transit-authority representative may wish to connect to a conference bridge in order to provide helpful information to participants, to learn information about the situation, or to communicate with other personnel. In similar ways, paramedics and other emergency personnel would find this connection to the bridge useful. The relevant phone numbers could be stored in an administrative database or otherwise provided to relevant personnel, and such users could call in while en route to a scene, on the scene, or from a central command center, for example.

In another exemplary implementation, concertgoers waiting in line connect to a conference bridge via the LBCR based on their location. A direct-dialing class of callers can call directly to the same bridge, and communicate with each other and the callers routed to the bridge based on their location. The other class of callers could obtain the direct dial number in various ways, such as from Internet listings, phone books, affinity publications (e.g., a magazine for fans of a particular music group). As such, in addition to concertgoers who are standing in line having the ability to easily connect with other concertgoers in line, as well as with concertgoers who are already inside the concert venue, interested callers remote to the concert can participate in the call.

In various embodiments, these users could connect to the conference call bridge based on their location and/or topic of interest (e.g., the concert). In one contemplated embodiment, users can initiate creation of a conference call bridge, impromptu, when an applicable bridge does not already exist. For example, in the concert example above, a first concertgoer calling a conference calling system seeking information or conversation about the concert could initiate formation of a conference bridge via the system, such as via bridge formation prompts, and second and subsequent concertgoers would be notified of the now available bridge. It one contemplated embodiment, the system 102 is configured to allow a direct-dialing caller to establish a conference bridge (e.g., bridge for the concert mentioned, above) to which others (e.g., concertgoers) can then be connected by way of the LBCR 104 based on their location.

In another contemplated embodiment, the system is configured to enable a user to query the system, such as via an application of the mobile communications device 114, to determine information about other participants on the conference call bridge. For example, the user could query the system during a call to determine whether any of the other callers are listed in a friends list or an address book stored on or accessible by the device 114. Among other ways known in the art for accomplishing this task, the system is in some embodiments configured to cross-reference phone numbers or other identifying indicia of the other participants with the same indicia in the friends-list or address-book entries. It is further contemplated that the system, including, for example, an onboard application, could further be configured to present the user with locations of any such friends and/or an option for communicating with them, such as via text messaging.

In some contemplated embodiments, companies hire employees to join calls occurring at the location sensitive conference calling system 100. During the conference calls, the employees speak about various services and/or products offered by the employees' companies. In some embodiments users are presented with advertisements associated with the user, such as by being related to a location, event, or topic. The location sensitive conference calling service is, in some embodiments, a service charged on a per use or per-minute basis. In some embodiments, the location sensitive conference calling service is included as part of a plan and is not charged separately. In some embodiments, the location sensitive conference calling system includes hardware and software for authenticating devices attempting to use the location sensitive conference calling service.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A location-sensitive conference-data-session system, comprising:
  a processor; and
  a computer-readable storage medium having computer-executable instructions that, when executed by the processor, cause the processor to perform operations comprising:
    establishing a peer-to-peer data session between the location-sensitive conference-data-session system and a mobile communications device;
    receiving, by way of the peer-to-peer data session, directly from the mobile communications device, a geographic-location communication comprising geographic-location information indicating a geographic location of the mobile communications device;
    identifying, using the geographic-location information of the geographic-location communication received, a conference-data-session system component to which to connect the geographic-location communication;
    receiving, by way of the peer-to-peer data session, directly from the mobile communications device, user information comprising data identifying the mobile communications device; and
    initiating, using the geographic-location information received and the user-information received, establishing a second data session, to use voice over internet protocol, between the mobile communications device and the conference-data-session system component identified.

2. The system of claim 1, wherein:
  the system further comprises a route database configured to store database information associating location data with multiple conference-data-session system components, including the conference-data-session system component, the route database being accessible by the processor; and
  the operation of identifying the conference-data-session system component comprises identifying the conference-data-session system component, of the multiple conference-data-session system components, by querying the route database using the geographic-location information.

3. The system of claim 1, wherein:
  the processor and the computer-readable storage medium are part of a location-based conference-data-session router;
  the location-based conference-data-session router further comprises a network interface; and
  the location-based conference-data-session router is associated with a device identifier.

4. The system of claim 1, wherein the processor and the computer-readable storage medium are part of a location-based conference-data-session router.

5. The system of claim 1, wherein:
the operation of receiving, by way of the peer-to-peer data session, directly from the mobile communications device, the geographic-location communication comprises receiving the geographic-location communication from the mobile communications device, by way of the peer-to-peer data session without interposition of a data server; and
the operation of receiving, by way of the peer-to-peer data session, directly from the mobile communications device, the user information comprises receiving the user information from the mobile communications device, by way of the peer-to-peer data session without interposition of such data server.

6. The system of claim 1, wherein receiving, by way of the peer-to-peer data session, the geographic location of the mobile communications device comprises receiving, using voice over internet protocol, audio user input indicating the geographic location of the mobile communications device.

7. A method, for providing a location-sensitive conference-data-session service, comprising:
establishing, by a location-based conference-data-session router using a processor, a peer-to-peer data session between the location-based conference-data-session router and a mobile communications device;
receiving, by the location-based conference-data-session router, directly from the mobile communications device, by way of the peer-to-peer data session, a geographic-location communication comprising geographic-location information indicating a geographic location of the mobile communications device;
identifying, by the location-based conference-data-session router, a conference-data-session system component to which to connect the geographic-location communication, the identifying being performed using the geographic-location information of the geographic-location communication received;
receiving, by the location-based conference-data-session router, directly from the mobile communications device, by way of the peer-to-peer data session user information comprising data identifying the mobile communications device; and
initiating, using the geographic-location information received and the user-information received, establishing a second data session, to use voice over internet protocol, between the mobile communications device and the conference-data-session system component identified.

8. The method of claim 7, wherein identifying the conference-data-session system component comprises:
transmitting the geographic-location information to a route database in communication with the location-based conference-data-session router; and
receiving, by the location-based conference-data-session router, data identifying the conference-data-session system component.

9. The method of claim 7, further comprising:
generating at least one query for the geographic-location information and the user information; and
transmitting the query, by way of the peer-to-peer data session, to the mobile communications device.

10. The method of claim 7, wherein receiving the geographic location of the mobile communications device comprises receiving, by way of the peer-to-peer data session, using voice over internet protocol, audio user input indicating the geographic location of the mobile communications device.

11. The method of claim 9, wherein receiving the geographic location of the mobile communications device comprises receiving global-positioning-service data generated by a global-positioning system associated with the mobile communications device.

12. The method of claim 7, wherein:
receiving, by way of the peer-to-peer data session, directly from the mobile communications device, the geographic-location communication comprises receiving the geographic-location communication from the mobile communications device, by way of the peer-to-peer data session without interposition of a data server; and
receiving, by way of the peer-to-peer data session, directly from the mobile communications device, the user information comprises receiving the user information from the mobile communications device, by way of the peer-to-peer data session without interposition of such data server.

13. A computer-readable storage device comprising computer-executable instructions that, when executed by a processor of a location-based conference-data-session router, cause the processor to perform operations comprising:
establishing a peer-to-peer data session between the router and a mobile communications device;
receiving, by way of the peer-to-peer data session, directly from the mobile communication device, a geographic-location communication comprising geographic-location information indicating a geographic location of the mobile communications device;
identifying, using the geographic-location information of the geographic-location communication received, a conference-data-session system component to which to connect the communication;
receiving, by way of the peer-to-peer data session, directly from the mobile communication device, user information comprising data identifying the mobile communications device; and
initiating, using the geographic-location information received and the user-information received, establishing a second data session, to use voice over internet protocol, between the mobile communications device and the conference-data-session system component identified.

14. The computer-readable storage device of claim 13, wherein the operations further comprise:
transmitting the geographic-location information to a route database in communication with the location-based conference-data-session router; and
receiving data identifying the conference-data-session system component.

15. The computer-readable storage device of claim 13, wherein the operations further comprise receiving the geographic-location information and the user information associated with the mobile communications device responsive to operations comprising:
generating at least one query for the geographic-location information and the user information; and
transmitting the query to the mobile communications device by way of the peer-to-peer data session.

16. The computer-readable storage device of claim 13, wherein the operation of receiving, by way of the peer-to-peer data session, the geographic location of the mobile communications device comprises receiving, using voice over internet protocol, audio user input indicating the geographic location of the mobile communications device.

17. The computer-readable storage device of claim 13, wherein:

the operation of receiving, by way of the peer-to-peer data session, directly from the mobile communications device, the geographic-location communication comprises receiving the geographic-location communication from the mobile communications device, by way of the peer-to-peer data session without interposition of a data server; and the operation of receiving, by way of the peer-to-peer data session, directly from the mobile communications device, the user information comprises receiving the user information from the mobile communications device, by way of the peer-to-peer data session without interposition of such data server.

\* \* \* \* \*